(12) United States Patent
Korbel et al.

(10) Patent No.: US 7,997,257 B2
(45) Date of Patent: Aug. 16, 2011

(54) METHOD AND A DEVICE FOR OPERATING A INTERNAL COMBUSTION ENGINE

(75) Inventors: Krzysztol Korbel, Regensburg (DE); Gerd Roesel, Regensburg (DE); Nobert Sieber, Obermichelfach (DE)

(73) Assignee: Continental Automotive GmbH, Hannover (DE)

( * ) Notice: Subject to any disclaimer, the term of this patent is extended or adjusted under 35 U.S.C. 154(b) by 297 days.

(21) Appl. No.: 12/403,392

(22) Filed: Mar. 13, 2009

(65) Prior Publication Data

US 2009/0248280 A1    Oct. 1, 2009

Related U.S. Application Data

(60) Provisional application No. 61/036,347, filed on Mar. 13, 2008.

(51) Int. Cl.
*F02D 41/00* (2006.01)

(52) U.S. Cl. ........................ 123/672; 123/690

(58) Field of Classification Search .............. 123/434, 123/672, 676, 690, 693; 701/108, 109, 114; 60/276, 299

See application file for complete search history.

(56) References Cited

U.S. PATENT DOCUMENTS

| | | | | |
|---|---|---|---|---|
| 4,028,642 A * | 6/1977 | Kushida et al. | ............... | 323/366 |
| 4,170,969 A * | 10/1979 | Asano | ............. | 123/680 |
| 4,391,250 A * | 7/1983 | Matsui | ............. | 123/438 |
| 7,499,792 B2 * | 3/2009 | Rosel et al. | ............... | 701/114 |
| 7,874,285 B2 * | 1/2011 | Barnikow et al. | ............. | 123/688 |

OTHER PUBLICATIONS

Basshuysen, et al., "Handbuch Verbrennungsmotor", Auflage, Vieweg & Sohn Verlagsgesellschaft, mbH, p. 559-561, Jun. 2002.

* cited by examiner

*Primary Examiner* — John T Kwon
(74) *Attorney, Agent, or Firm* — King & Spalding L.L.P.

(57) ABSTRACT

For operating a internal combustion engine a first characteristic value is determined depending on a distance integral of at least a portion of a control signal of an oxygen sensor control based on control reference signal characteristics across a given time period. Depending on the first characteristic value ($KW\_1$) a quality value ($GW\_1$) is determined. Depending on the quality value (GW1) either the existence or the non existence of an error of the exhaust sensor is detected.

20 Claims, 4 Drawing Sheets

METHOD AND A DEVICE FOR OPERATING A INTERNAL COMBUSTION ENGINE

CROSS-REFERENCE TO RELATED APPLICATIONS

This application claims priority to commonly owned U.S. Provisional Patent Application Ser. No. 61/036,347; filed Mar. 13, 2008; and is hereby incorporated by reference herein for all purposes.

TECHNICAL FIELD

The invention relates to a method and a device for operating a internal combustion engine comprising an exhaust gas system, which comprises an exhaust gas catalytic converter and an exhaust gas sensor. An oxygen sensor control is provided, whose error signal is determined depending on a measurement signal of the exhaust gas sensor and a forced excitation signal and whose control signal controls a fuel mass to be proportioned.

BACKGROUND

Increasingly strict legal regulations concerning permitted pollutant emissions of motor vehicles in which internal combustion engines are arranged necessitate keeping the pollutant emissions during operation of the internal combustion engine as low as possible. On the one hand this may be affected by reducing the pollutant emissions which arise during the combustion of the air fuel mixture in the respective cylinder of the internal combustion engine.

On the other hand exhaust gas aftertreatment systems are in use in internal combustion engines which convert the pollutant emissions arising during the combustion process of the air fuel mixture in the respective cylinders to harmless substances.

For example, to this end exhaust gas catalytic converters are employed, which convert carbon monoxide, hydrocarbon and nitrogen oxides to harmless substances.

The selective control of the generation of the pollutant emissions during combustion as well as the conversion of the toxic components by means of a catalytic converter having a high degree of efficiency require a precisely adjusted air fuel ratio in the respective cylinder.

From the reference book "Handbuch Verbrennungsmotoren", editors Richard van Basshuysen, Fred Schäfer, second edition, Vieweg & Sohn Verlagsgesellschaft mbH, June 2002, pp. 559 to 561, a linear lambda control having a linear lambda oxygen sensor is known, which is arranged upstream of an exhaust gas catalytic converter, and having a binary lambda oxygen sensor, which is arranged downstream of the exhaust gas catalytic converter. A lambda set point is filtered by means of a filter, the gas propagation delay and the sensor behaviour are accounted for. The lambda set point such filtered serves as the control variable of a $PII^2D$ oxygen sensor control, whose actuating variable serves as an adjustment for the amount of fuel injected.

Associated with the lambda control one or multiple lambda oxygen sensors become important. On this account increasingly stringent legal regulations are implemented, which require a very strict monitoring of the respective lambda oxygen sensors. For instance, in line with the legislation of the State of California (Title 13, California Code Regulations, Section 1968.2, Chapter (e) (7)), besides an existing dynamic diagnostics of a lambda oxygen sensor for the detection of a dynamic symmetrical deterioration arranged upstream of an exhaust gas catalytic converter additionally the detection of a asymmetrically deteriorated lambda oxygen sensor is required. In this context a dynamic symmetrical deterioration of the lambda oxygen sensor is to be understood such that its response behaviour is delayed symmetrically after a change in the air fuel ratio from lean to rich and vice versa. During a dynamic asymmetric deterioration only the response behaviour of one of both transitions shows a slowing down of the signal reaction. The slowing down of the signal reaction here expresses itself regularly in a delay of the step response as a reaction to a variation of the mixture, in a reduced slope of the shoulder or in a combination of both. In this context it is a particular challenge to achieve diagnostic results which are robust and suitable for operation in the field throughout the required lifetime and considering all possible operating conditions, in particular considering tightened demands concerning mileages of up to 150,000 miles.

SUMMARY

According to various embodiments, a method and a device for operating a internal combustion engine can be provided which allow for a straightforward and dependable operation of the internal combustion engine.

According to an embodiment, a method for operating a internal combustion engine with an exhaust gas system comprising an exhaust gas catalytic converter and an exhaust gas sensor, may comprise the steps of:
  providing an oxygen sensor control whose error signal is determined depending on a measurement signal of the exhaust gas sensor and a forced excitation signal, and whose control signal controls the fuel mass to be proportioned,
  determining a first characteristic value depending on a distance integral of at least a portion of the control signal across a given time period,
  determining a quality value depending on the first characteristic value and
  detecting depending on the quality value either the existence or the non existence of an error of the exhaust sensor.

According to another embodiment, a device for operating an internal combustion engine with an exhaust gas system may comprise an exhaust gas catalytic converter, an exhaust gas sensor, and an oxygen sensor control whose error signal is determined depending on a measurement signal of the exhaust gas sensor and a forced excitation signal, whose control signal controls the fuel mass to be proportioned, wherein the device may be operable to
  determine a first characteristic value depending on a distance integral of at least a portion of the control signal of the oxygen sensor control based on a control reference signal characteristics across a given time period, determine a quality value depending on the first characteristic value, and
  to determine either the existence or the non existence of an error of the exhaust sensor depending on the quality value.

According to a further embodiment, a second characteristic value may be determined depending on a distance integral of a forced excitation signal of the oxygen sensor control based on a forced excitation reference signal characteristic across the given time period, and the quality value may be determined depending on the first and the second characteristic values. According to a further embodiment, the quality value may be determined depending on at least one of a averaged first and averaged second characteristic value.

According to a further embodiment, the control reference signal characteristics may be determined by a filtering of the control signal. According to a further embodiment, the control reference signal characteristics may be determined depending on a gliding averaging of the control signal. According to a further embodiment, the forced excitation reference signal characteristics may be determined by a filtering of the forced excitation signal. According to a further embodiment, the forced excitation reference signal characteristics may be determined depending on a gliding averaging of the forced excitation signal. According to a further embodiment, depending on a comparison of the quality value with a given error threshold value either the existence or the non existence of an error of the exhaust sensor may be detected. According to a further embodiment, the error threshold value may be determined depending on at least a value representing the load at the internal combustion engine. According to a further embodiment, the error threshold value may be determined depending on a given characteristic ageing value of the exhaust gas catalytic converter. According to a further embodiment, the given time period may correspond to a cycle duration of the forced excitation.

BRIEF DESCRIPTION OF THE DRAWINGS

Embodiments are described in more detail by means of schematic drawings.

Figure 1:
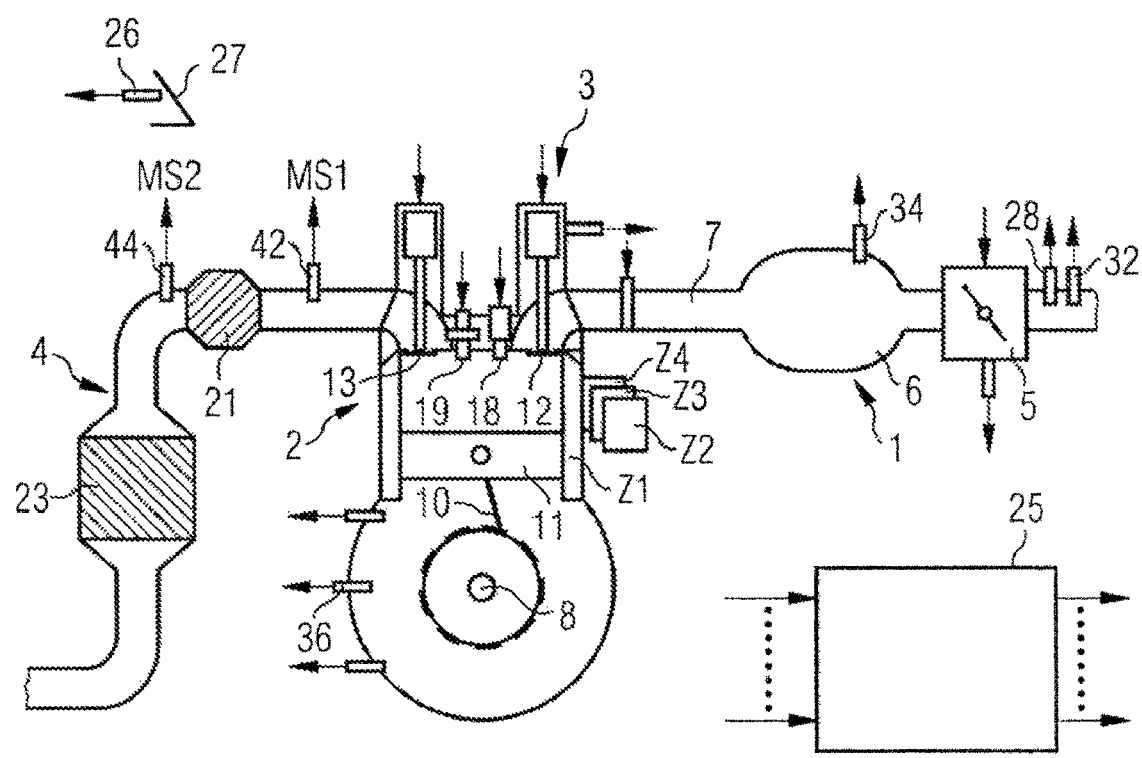
FIG. 1 shows a internal combustion engine comprising a control device.

Elements of equal construction or function are characterized by equal reference numerals throughout the figures.

DETAILED DESCRIPTION

According to various embodiments, a method and a corresponding device for operating a internal combustion engine having an exhaust gas system comprise an exhaust gas catalytic converter and an exhaust gas sensor. An oxygen sensor control is provided, whose error signal is determined depending on a measurement signal of the exhaust gas sensor and a forced excitation signal. The forced excitation signal may for example be filtered. The control signal of the oxygen sensor control controls a fuel mass to be proportioned. A first characteristic value is determined depending on a distance integral of at least a portion of a control signal of the oxygen sensor control based on control reference signal characteristics across a given time period. Depending on the first characteristic value a quality value is determined. Depending on the quality value either the existence or the non existence of an error of the exhaust sensor is diagnosed. In this way an error of the exhaust gas sensor, which in particular may be a lambda oxygen sensor, may be detected in a very precise manner. Such, deteriorations of sensors in relation to their reaction time, a change of their PT1 characteristics, and symmetrical and asymmetrical symptoms of ageing may be detected for example.

Preferably, in this context a comparison of the quality value with a given threshold value is carried out and, depending on this comparison, a detection of the existence or the non existence of the error of the exhaust sensor is carried out.

As an example, the proportion of the control signal may represent a P and/or I proportion, and may particularly correlate with these.

According to an embodiment a second characteristic value is determined depending on a distance integral of a forced excitation signal of the oxygen sensor control based on forced excitation reference signal characteristics across a given time period. In this manner the exhaust gas sensor may particularly reliably only then be identified as defective, if a given increased emission of pollutants can be expected downstream of the exhaust gas catalytic converter and such an error diagnosis for the overall system may be very strongly limited.

The term "distance integral" is particularly meant to describe that an absolute area is determined between the control reference signal characteristics and the control signal of the oxygen sensor control. The corresponding holds true for the distance integral of the forced excitation signal of the oxygen sensor control in relation to the forced excitation reference signal characteristics.

The control reference signal characteristics may for example also correlate with reference value characteristics of the oxygen charge. The distance integral may in principle also be related to a reference distance integral, which is determined for a reference exhaust gas sensor.

According to a further embodiment the quality value is determined depending on a averaged first and/or a averaged second characteristic value. In this way variances may be filtered out in a very straightforward manner and thus a particularly reliable detection of the existence or the non existence of the error of the exhaust sensor may be detected.

According to a further embodiment the reference signal characteristics is determined by a filtering of the control signal. In this way a suitable control reference signal characteristics may be determined in a particularly simple manner.

According to a further embodiment the control reference signal characteristics is determined depending on a gliding averaging of the control signal. Also, this way a particularly straightforward qualified determination of the control reference signal characteristics is allowed for.

According to a further embodiment the forced excitation reference signal characteristics is determined by filtering the forced excitation signal. Also, this way a particularly straightforward qualified determination of the forced excitation characteristics is allowed for.

In this context it proves advantageous, if the forced excitation reference signal characteristics are determined depending on a gliding averaging of the forced excitation signal. In particular, this may be implemented mathematically in a straightforward manner.

According to a further embodiment either the existence or the non existence of the error of the exhaust sensor is determined depending on a comparison of the quality value with a given error threshold value. In this manner it is mathematically particularly straightforward and reliable to detect the existence or the non existence of the error of the exhaust sensor.

According to a further embodiment the error threshold value is determined depending on at least one value representing the load of the internal combustion engine. In this manner a particularly precise detection of the existence or the non existence of the error of the exhaust sensor is allowed for.

According to a further embodiment the error threshold value is determined depending on a given ageing specific value of the exhaust gas catalytic converter. In this manner a relevance of the condition of the exhaust gas sensor with respect to pollutant emissions downstream of the exhaust gas catalytic converters may be accounted for particularly straightforward and precise.

According to a further embodiment the given time period is a cycle duration of the forced excitation. This then may be mathematically implemented particularly straightforward.

A internal combustion engine (FIG. 1) comprises a intake section 1, an engine block 2, a cylinder head 3 and an exhaust gas system 4. The intake section 1 preferably comprises a throttle body 5, as well as a manifold 6 and a intake manifold 7, which is directed to cylinder Z1 via a inlet port in the engine block 2. The engine block 2 further comprises a crankshaft 8, which is coupled to the piston 11 of cylinder Z1 via a connecting rod 10.

Cylinder head 3 comprises a valve train assembly having a gas inlet valve 12 and a gas outlet valve 13.

Cylinder head 3 further comprises a fuel injection valve 18, which may also be arranged in the intake manifold 7. Cylinder head 3 further comprises a spark plug 19.

Arranged in the exhaust gas system 4 is an exhaust gas catalytic converter 21 which may be formed as a three way catalytic converter for example. A control device 25 is provided with dedicated sensors which pick up different measurement values and determine the respective amplitude of the measurement value. Besides the measurement values, operating values also comprise values derived from these. The control device 25 is designed to determine actuating values depending on at least one of the operating values, which are then transformed into one or more actuating variables for controlling the actuating elements by means of respective actuating drives. The control device 25 may also be characterized as a device for operating the internal combustion engine.

The sensors consist of a pedal position encoder 26, which detects a accelerator pedal position of a accelerator pedal 27, a air flow sensor 28, which detects a air flow stream upstream of the throttle body 5, a first temperature sensor 32, which detects a intake air temperature, a intake manifold pressure sensor 34, which detects a intake manifold pressure in the manifold 6, and a crankshaft angle sensor 36, which detects a crankshaft angle to which a rotational frequency is assigned.

Further, a first exhaust gas sensor 42 is provided, which is arranged upstream to the exhaust gas catalytic converter 21 or inside the exhaust gas catalytic converter 21 and which detects a residual oxygen concentration of the exhaust gas and whose measurement signal MS1 characterizes the air fuel ratio in the combustion chamber of cylinder Z1 and upstream from the first exhaust gas sensor 42 prior to oxidation of the fuel, in the following named the air fuel ratio in the cylinders Z1 to Z4. The first exhaust gas sensor 42 may also be arranged in the exhaust gas catalytic converter 21 such that a portion of the catalytic converter volume is located upstream from the first exhaust gas sensor 42.

For example, the first lambda oxygen sensor 42 may be a linear lambda oxygen sensor or may also be a binary lambda oxygen sensor.

Further, preferably a second exhaust gas sensor 44 is arranged downstream from the exhaust gas catalytic converter 21, which in particular is utilized in the context of a trimming control and which preferably is formed as a plain binary lambda oxygen sensor.

Depending on the embodiment any subset of the sensors mentioned may be present or additional sensors may be present as well.

For example, the actuating elements consist of the throttle body 5, the gas inlet and the gas outlet valves 12, 13, the fuel injection valve 18 or the spark plug 19.

Besides cylinder Z1 preferably also further cylinders Z2 to Z4 are provided to which then also respective ones of the actuating elements and if applicable of the sensors are dedicated. In principle, the internal combustion engine thus may have any number of cylinders.

Figure 2:
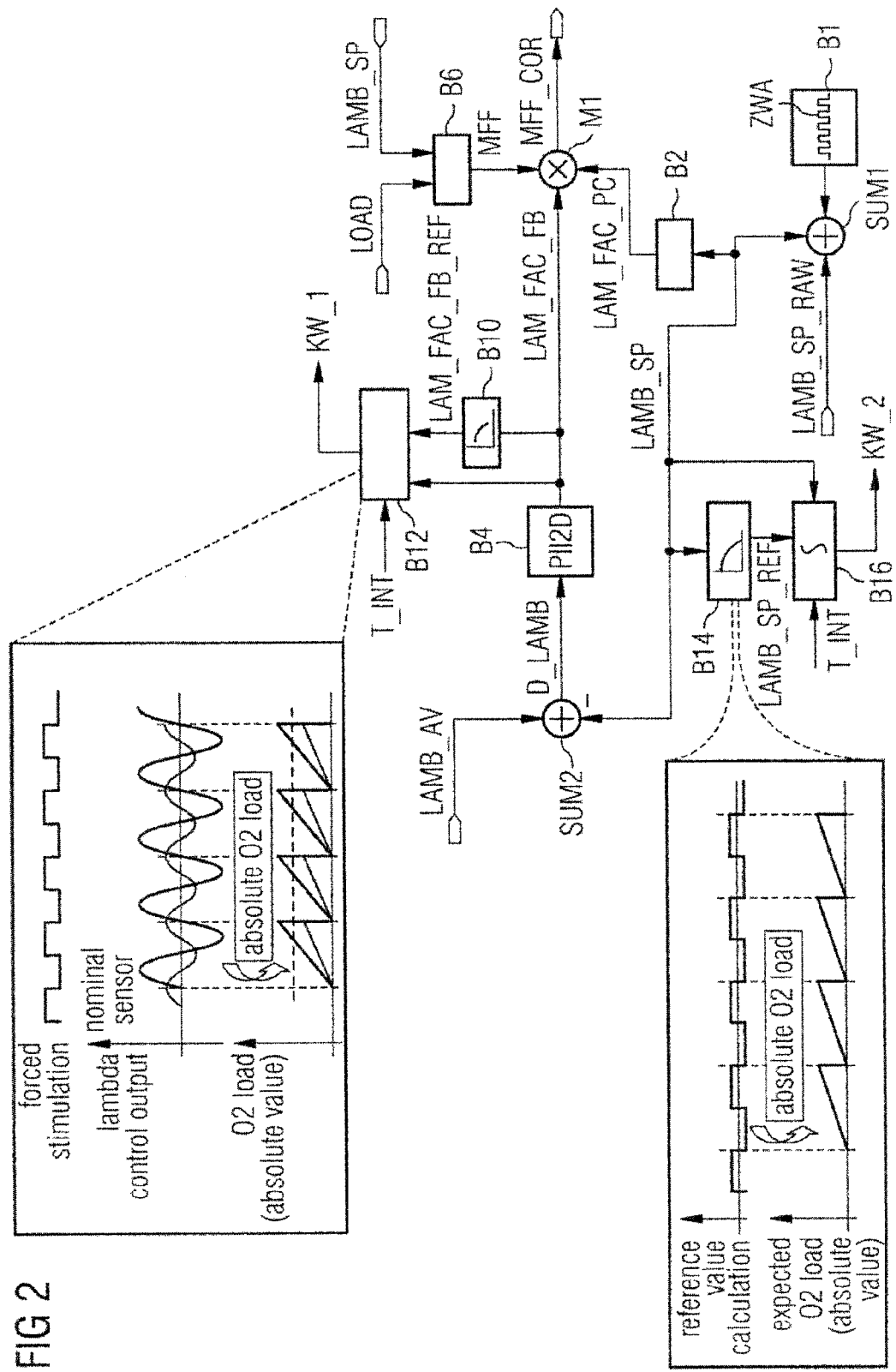
FIG. 2 shows a block diagram of a portion of the control device.

A block diagram of a part of the control device 25 is shown in FIG. 2. A given reference value LAMB_SP_RAW of the air fuel ratio may be fixedly predetermined in a particularly plain embodiment. However, it is preferably determined for example depending on the actual operating mode of the internal combustion engine, such as a homogeneous or stratification operation and/or depending on operating characteristics of the internal combustion engine. In particular, the reference value LAMB_SP_RAW of the air fuel ratio may be preset as representing about the stoichiometric air fuel ratio.

In a block B1 a forced excitation raw signal ZWA is determined and the reference value LAMB_SP_RAW of the air fuel ratio is modulated with the forced excitation raw signal ZWA in the first summing element SUM1. The forced excitation raw signal ZWA preferably is a rectangular signal, also having a variable amplitude if applicable. However, it also may take other forms and such may for example be a triangular shaped or a trapezoidal signal. The output value of the first summing element SUM1 then forms the forced excitation signal LAMB_SP. The forced excitation signal LAMB_SP is directed to a block B2 comprising a map-based pilot control and generating a lambda pilot control factor LAMB_FAC_PC depending on the forced excitation signal LAMB_SP.

In a second summing element SUM2, depending on the forced excitation signal LAMB_SP and the detected air fuel ratio LAMB_AV determined form the measurement signal MS1 of the exhaust gas sensor 42 and if applicable corrected by a trimming control intervention, a control difference D_LAMB, being a input value into a block B4, is determined by establishing a difference.

In block B4 a linear oxygen sensor control is formed and that preferably as a $PII^2D$ control. The actuating variable of the linear oxygen sensor control of block B4 acts as a control signal LAMB_FAC_FB and as such may be a percental value, for example. In particular, also the control signal LAM_FAC_FB may for example be added to the lambda pilot control factor LAM_FAC. As such, the lambda pilot control factor LAM_FAC_PC may for example have a value of 1.02 in a specific situation and the control signal may have a value of 0.03, corresponding to 2%, and thus the sum of both may be formed in the block and those together then may be fed to the multiplier element M1 as input value.

Concerning a possibly existing trimming control, reference is made to the reference book "Handbuch Verbrennungsmotor", editors Richard van Basshuysen, Fred Schäfer, second edition, Vieweg & Sohn Verlagsgesellschaft mbH, June 2002, pp. 559 to 561, the content of which herewith is incorporated concerning this matter.

The forced excitation signal may also be subjected to a filtering, which may for example take into account gas propagation delays or also may take into account the characteristics of the exhaust gas catalytic converter 21 or also of the exhaust gas sensor 21 in the form of a model.

Further, a block B6 is provided in which, depending on a value LOAD representing a load of the internal combustion engine and which for example may be a air flow stream, and depending on the forced excitation signal LAMB_SP, a basic fuel mass MFF to be proportioned is determined. The fuel mass MFF to be proportioned is determined by forming the multiplication product of the basic fuel mass MFF to be proportioned and of the lambda pilot control factor LAM_FAC_PC and of the control signal LAM_FAC_FB in the multiplier element M1, wherein to do so also the sum formed of the control signal LAM_FAC_FB and of the lambda pilot control factor LAM_FAC_PC may be used as described above. The fuel injection valve 18 is then activated accordingly for proportioning the fuel mass MFF_COR to be proportioned. In a block B10 a filter for filtering the control signal is formed and the output value of block B10 then forms a control reference signal characteristic. For example, the filter of block B10 may be formed such that a form of averaging of the input signal is carried out, wherein a particularly plain implementation is allowed for by a gliding averaging. In a particularly plain embodiment the filter in block B10 also may be abandoned and the control reference signal characteristics LAM_FAC_FB_REF may be fixedly preset.

A block B12 is formed in order to determine a first characteristic value KW_1 depending on a distance integral of at least a portion of the control signal. LAM_FAC_FB based on the control reference signal characteristics LAM_FAC_FB_REF across a given time period T_INT. In doing so, the given time period is for example predetermined such that it corresponds to the cycle duration of the forced excitation raw signals ZWA. Preferably, the determination of the first characteristic value KW_1 is carried out in block B12, for example periodically, such that a new updated first characteristic value KW_1 is continuously output at the output of block B12. Furthermore, during the determination of the first characteristic value KW_1 also a conversion may be carried out after the determination of the distance integral and insofar a taking into acoount of an oxygen load equivalent may take place, wherein then yet at least one other operating value of the internal combustion engine is taken into account, such as for example the value LOAD representing the load.

The determination of the distance integral may such be effected by means of the control signal LAM_FAC_FB or also by means of only a proportion of the control signal LAM_FAC_FB, as for example a P and/or a I portion.

Preferably, in a block B14 a filter is formed as well by means of which the forced excitation signal LAMB_SP is filtered and in doing so a forced excitation reference signal characteristic LAM_SP_REF is output at the output of block B14. In particular the filter is formed by executing a filtering oriented at a mean value and may as such for example be formed to carry out a gliding averaging.

However, in a plain embodiment the forced excitation reference signal characteristics LAM_SP_REF may for example also be preset in a fixed manner.

Further, a block B16 is provided which is designed to determine a second characteristic value KW_2 depending on a distance integral of the forced excitation signal LAM_SP based on the forced excitation reference signal characteristics LAM_SP_REF over the given time period T_INT. In doing so, in block B16 also the second characteristic value KW_2 is preferably determined periodically. Further, as a basic principle, a conversion and in this respect an accounting for an oxygen load equivalent may also be carried out during determination of the second characteristic value after the determination of the respective distance integral.

A first program stored in a memory of the control device 25 and executed during the operation of the internal combustion engine is described in more detail with respect to the flow chart of FIG. 3 in the following. In step S1 variables may be initialized, if applicable.

In a step S2 a quality value GW is determined depending on at least the first characteristic value KW_1 and preferably additionally also depending on the second characteristic value KW_2. The determination of the quality value may for example comprise that a quotient of the first and second characteristic values KW_1, KW_2 is determined.

In a step S4 an error threshold value THD_ERR is determined and that preferably depending on a value LOAD representing a load of the internal combustion engine and/or depending on a characteristic ageing value AGE for a ageing condition of the exhaust gas catalytic converters 21, which in particular represents its oxygen storing capabilities. The determination of the error threshold value THD_ERR may for example be carried out depending on a given engine characteristic map. The error threshold value THD_ERR may however be predetermined fixedly in a plain embodiment.

In a step S6 it is subsequently verified, if the quality value GW is greater than the error threshold value THD_ERR. If this is the case, the existence ERR of an error is then identified in a step S8. However, if the constraint of step S6 is not fulfilled, the non existence N_ERR of an error of the exhaust sensor 42 is then identified in a step S10. Following the execution of steps S8 and S10 the processing is ended in a step S12. Preferably, the program according to FIG. 3 is executed again in periodic intervals and that during the operation of the internal combustion engine.

Figure 3:
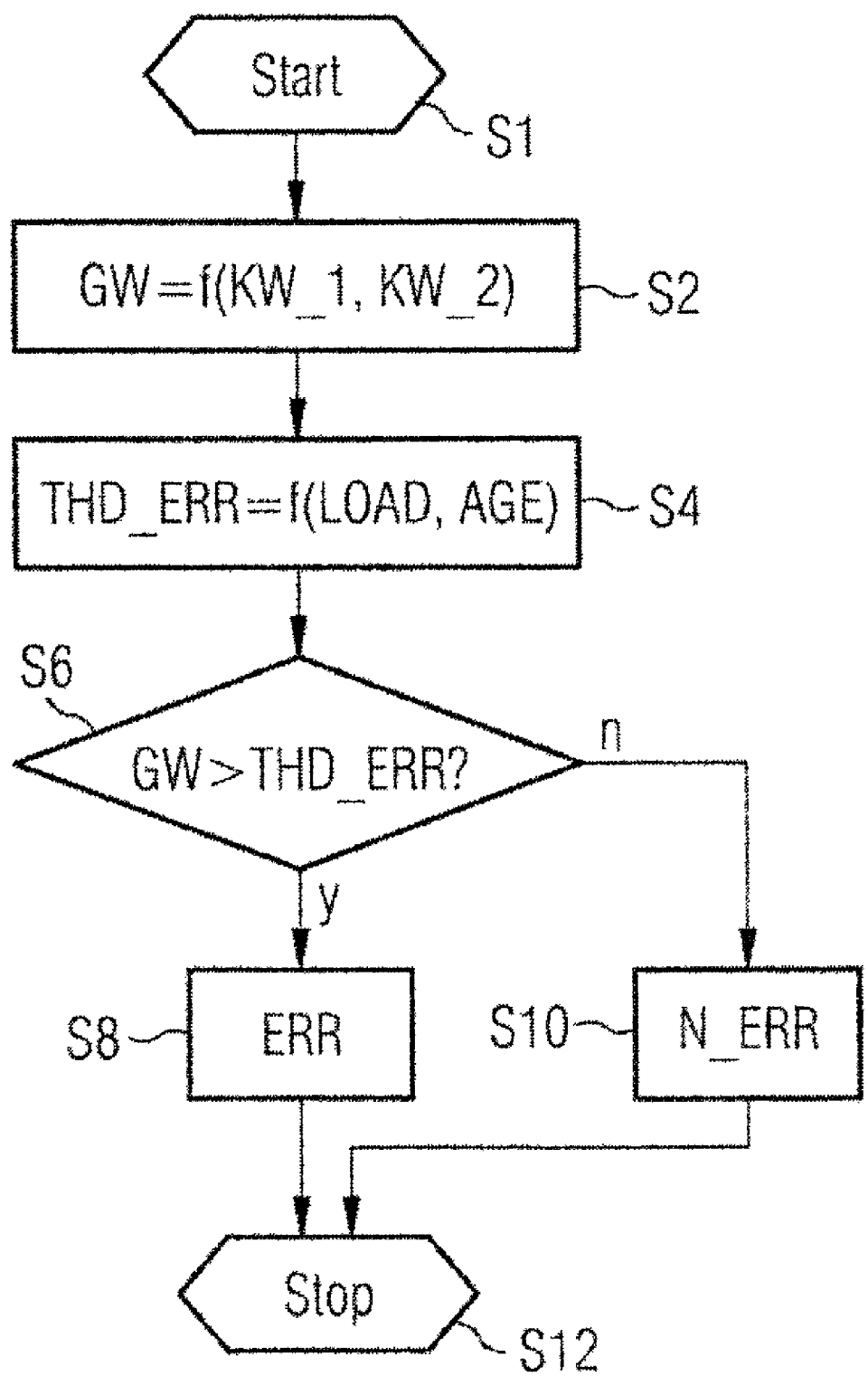
FIG. 3 shows a flow chart of a first program.
Figure 4:
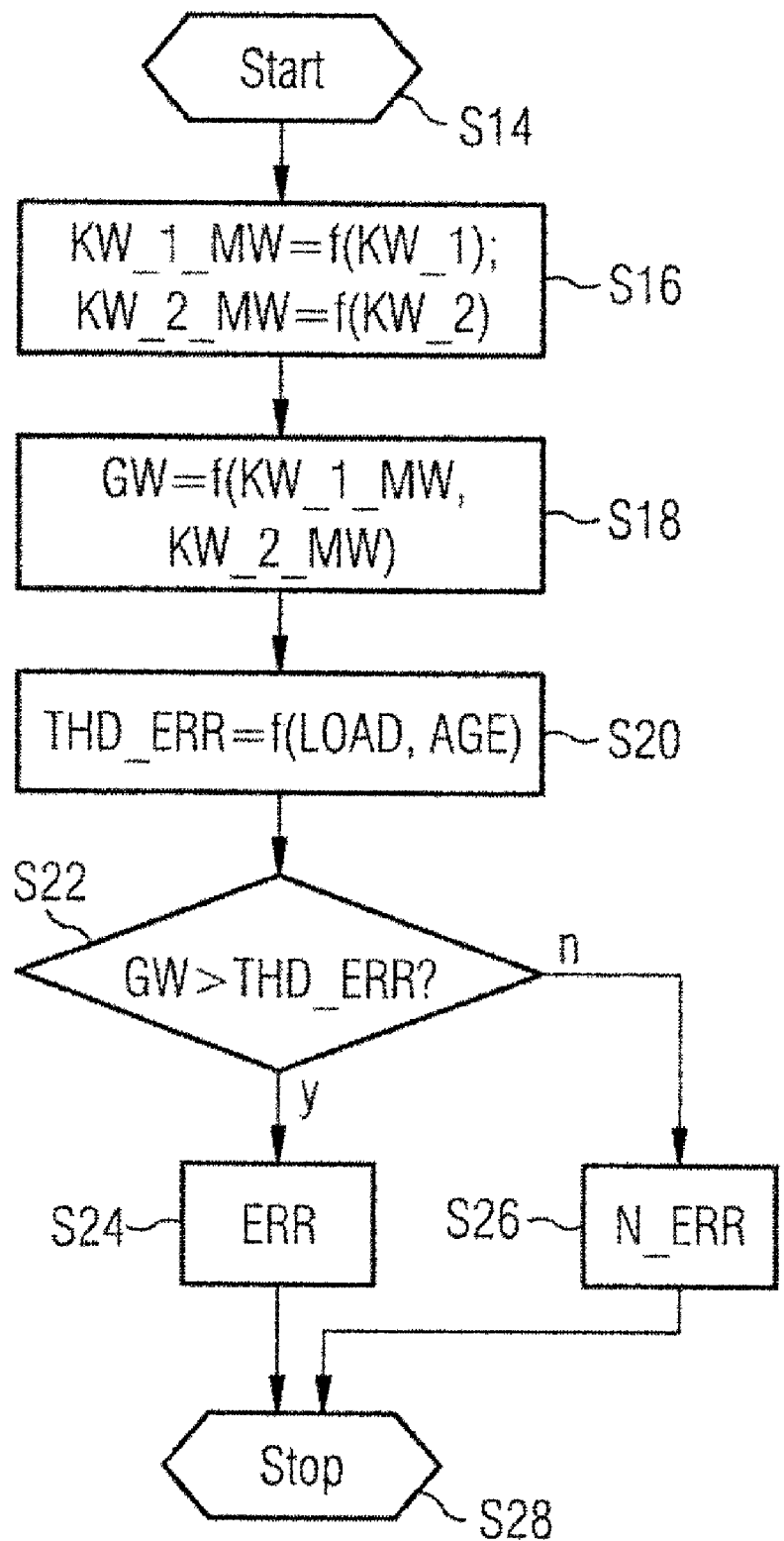
FIG. 4 shows a flow chart of a second program.

A further program also stored in the memory of the control device 25 and executed during its operation according to the program of FIG. 3 is initialized in a step S14, in which variables may be initialized, if applicable.

In a step S16 a averaged first characteristic value KW_1_MW is determined by averaging first characteristic values KW_1 determined in several different computation cycles. In doing so, a averaging may for example be carried out for the determined first characteristic values KW_1 which have been determined for a given number of time periods T_INT, such as for example for 5 or 10 or also notedly more. In this context, as a basic principle, also a gliding averaging may be utilized.

Correspondingly, also a averaged second characteristic value KW_2_MW is determined in step S16 depending on respective second characteristic values KW_2.

A step S18 then corresponds to the step 32 in this respect in that a determination of the quality value SW is carried out using the averaged first characteristic value KW_1_MW and the averaged second characteristic value KW_2_MW, respectively, instead of using the first characteristic value KW_1 and/or the second characteristic value KW_2.

The steps S20 to S28 then correspond to the steps S4 to S12.

By determining the error threshold value THD_ERR depending on the ageing condition AGE of the exhaust gas catalytic converter it is feasible that the existence ERR of the error of the exhaust gas sensor 42 in a new exhaust gas catalytic converter may only occur later with stronger pronounced dynamic sensor defects due to the higher efficiency of the catalytic converter. In an older exhaust gas catalytic converter having a lower efficiency the error threshold value ERR may be so low, that an existence of an error ERR is effected already with minor raises of the load.

From values in line with the error detection the impact in the system is evaluated and this allows that errors only then must be identified, if also raised loads are collected at the exhaust gas sensor 42. This way basically no rate actions are required which in contrast are required if direct diagnostic criteria are used as for example direct conclusions from the measurement signal MS1 to emissions. Furthermore, all types of sensor ageing may be detected, as for example reaction time, changes of the PT1 behaviour, symmetrical and asymmetrical occurrences of ageing and that in particular if this results in a swing up of the oxygen sensor control and therefore its control signal LAM_FAC_FB.

The invention claimed is:

1. A method for operating a internal combustion engine with an exhaust gas system comprising an exhaust gas catalytic converter and an exhaust gas sensor, the method comprising the steps of:
    determining a control signal for an oxygen sensor control, the control signal controlling a fuel mass to be proportioned in the internal combustion engine;
    determining an error signal for an oxygen sensor control based at least on a measurement signal of the exhaust gas sensor and a forced excitation signal;
    determining a first characteristic value depending on a distance integral of at least a portion of the control signal across a given time period,
    determining a quality value depending on the first characteristic value and
    detecting depending on the quality value either the existence or the non existence of an error of the exhaust sensor.

2. The method according to claim 1, wherein a second characteristic value is determined depending on a distance integral of the forced excitation signal across the given time period, and
    the quality value is determined depending on the first and the second characteristic values.

3. The method according to claim 1, wherein the quality value is determined depending on at least one of a averaged first and averaged second characteristic value.

4. The method according to claim 1, wherein the control reference signal characteristics is determined by a filtering of the control signal.

5. The method according to claim 1, wherein the control reference signal characteristics is determined depending on a gliding averaging of the control signal.

6. The method according to claim 1, wherein the forced excitation reference signal characteristics is determined by a filtering of the forced excitation signal.

7. The method according to claim 1, wherein the forced excitation reference signal characteristics is determined depending on a gliding averaging of the forced excitation signal.

8. The method according to claim 1, wherein depending on a comparison of the quality value with a given error threshold value either the existence or the non existence of an error of the exhaust sensor is detected.

9. The method according to claim 8, wherein the error threshold value is determined depending on at least a value representing the load at the internal combustion engine.

10. The method according to claim 8, wherein the error threshold value is determined depending on a given characteristic ageing value of the exhaust gas catalytic converter.

11. The method according to claim 1, wherein the given time period corresponds to a cycle duration of the forced excitation.

12. A device for operating an internal combustion engine with an exhaust gas system comprising an exhaust gas catalytic converter, an exhaust gas sensor, and an oxygen sensor control, the oxygen sensor control having a control signal operable to control a fuel mass to be proportioned in the internal combustion engine, and further having an error signal that is determined depending on a measurement signal of the exhaust gas sensor and a forced excitation signal, wherein the device is operable to
    determine a first characteristic value depending on a distance integral of at least a portion of the control signal of the oxygen sensor control based on a control reference signal characteristics across a given time period, determine a quality value depending on the first characteristic value, and
    determine either the existence or the non existence of an error of the exhaust sensor depending on the quality value.

13. The device according to claim 12, wherein the device is operable to determine a second characteristic value is determined depending on a distance integral of the forced excitation signal across the given time period, and to determine the quality value depending on the first and the second characteristic values.

14. The device according to claim 12, wherein the device is operable to determine the quality value depending on at least one of a averaged first and averaged second characteristic value.

15. The device according to claim 12, wherein the device is operable to determine the control reference signal characteristics by a filtering of the control signal.

16. The device according to claim 12, wherein the device is operable to determine the control reference signal characteristics depending on a gliding averaging of the control signal.

17. The device according to claim 12, wherein the device is operable to determine the forced excitation reference signal characteristics by a filtering of the forced excitation signal.

18. The device according to claim 12, wherein the device is operable to determine the forced excitation reference signal characteristics depending on a gliding averaging of the forced excitation signal.

19. The device according to claim 12, wherein the device is operable to detect depending on a comparison of the quality value with a given error threshold value either the existence or the non existence of an error of the exhaust sensor.

20. The device according to claim 19, wherein the device is operable to determine the error threshold value depending on at least a value representing the load at the internal combustion engine.

* * * * *